United States Patent [19]

Malczewski

[11] 4,221,073

[45] Sep. 9, 1980

[54] FLUID FLOW AND VISCOSITY DISPLAY TOY

[76] Inventor: Donna J. Malczewski, 64 Garden Rd., Cheektowaga, N.Y. 14225

[21] Appl. No.: 4,275

[22] Filed: Jan. 17, 1979

[51] Int. Cl.³ .................... A63H 33/00; G09B 23/06; G01H 11/04
[52] U.S. Cl. ........................................ 46/1 R; 73/56; 35/19 R
[58] Field of Search .............. 46/1 R; 35/18 R, 19 R; 40/406; 73/56

[56] References Cited

U.S. PATENT DOCUMENTS

| | | | |
|---|---|---|---|
| 1,635,281 | 7/1927 | Larson | 73/56 |
| 1,639,057 | 8/1927 | Peabody | 73/56 |
| 1,758,677 | 5/1930 | Smith | 73/56 |
| 2,598,910 | 6/1952 | Head | 73/56 |
| 3,766,773 | 10/1973 | Limpert | 73/56 |

*Primary Examiner*—Louis G. Mancene
*Assistant Examiner*—Michael J. Foycik, Jr.
*Attorney, Agent, or Firm*—Allen J. Jaffe

[57] ABSTRACT

An amusement device for young children having a six-sided open frame with four sides thereof providing handles to orient three closed and separate chambers located between the other two sides, each chamber containing a fluid or material of different viscosity than that contained in any other chamber and having a pair of enlarged volume ends connected by restricted passageways. The chambers are transparent such that observation of the different flow rates can take place.

2 Claims, 3 Drawing Figures

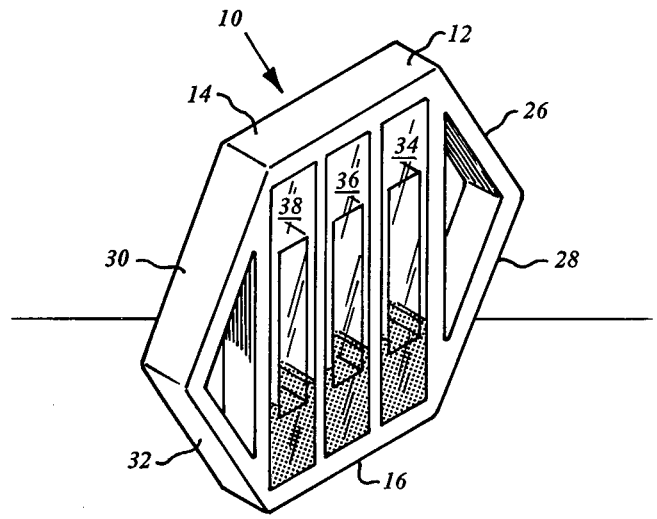
Fig. 1
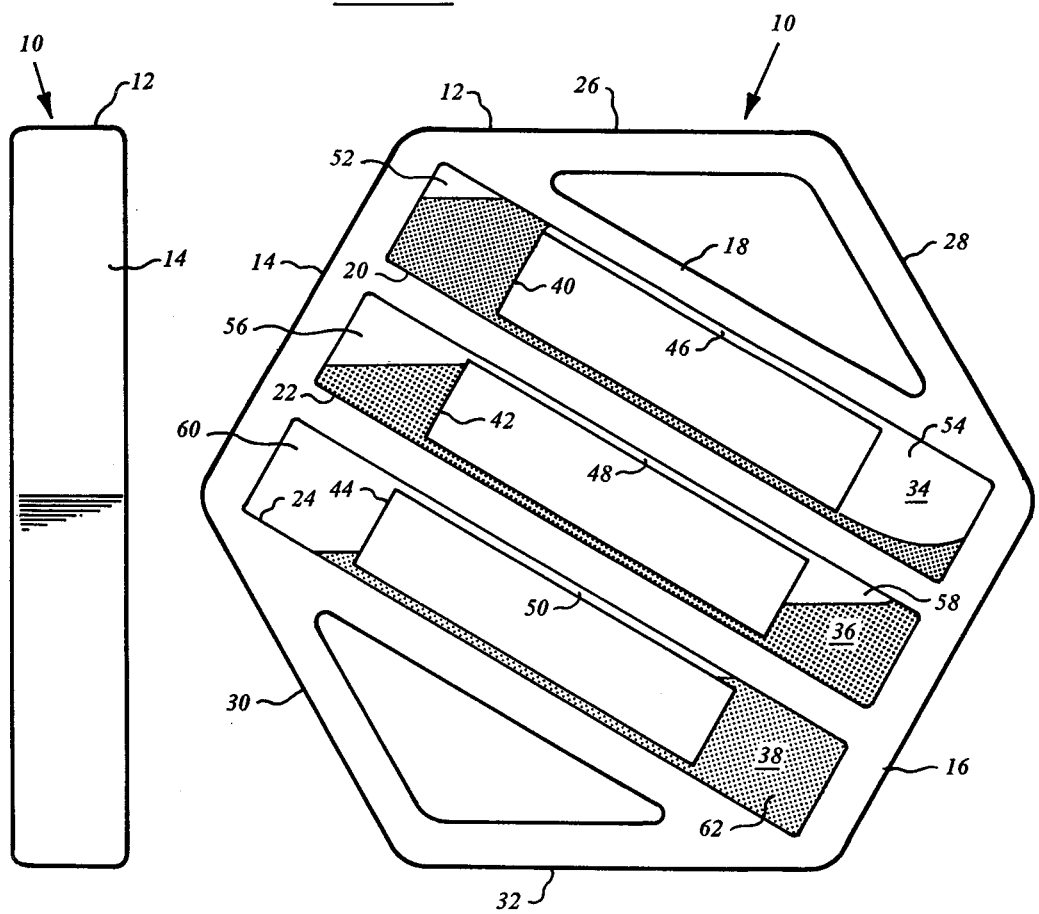
Fig. 3
Fig. 2

FLUID FLOW AND VISCOSITY DISPLAY TOY

The present invention relates to a child's amusement device that is both entertaining and educational. More particularly, the present invention relates to a device in which different rates of fluid flow are observable by a child as the device is placed in various positions. The observation of different flow rates is entertaining to the very young child and is subliminally educationally as well.

Essentially, the present invention provides a housing containing a plurality of separate closed chambers, each chamber having enlarged volume sections at each end in fluid communication with reduced or restricted volume sections therebetween, fluids of different viscosities in each of the chambers and means to orient the housing in varying positions such that the different flow rates in each chamber can be observed as the fluid flows from one enlarged volume section through the restricted volume section to the other enlarged volume section of each chamber.

BRIEF DESCRIPTION OF THE DRAWINGS

For a fuller understanding of the present invention, reference should now be had to the following detailed description thereof taken in conjunction with the accompanying drawings wherein;

FIG. 1 is a pictorial view of the device according to the present invention;

FIG. 2 is a front view showing the device in a different position; and

FIG. 3 is a side view.

DESCRIPTION OF THE PREFERRED EMBODIMENT

Referring to the drawings, the amusement device is generally depicted at 10 and comprises multisided open frame or housing 12. For convenience the frame 12 is shown as a six sided structure, two opposite sides 14 and 16 of which defining a central observation section comprised of partitions 18, 20, 22 and 24 therebetween. The sides 26 and 28 adjacent partition 18 define therewith a hollow triangular section whereas the sides 30 and 32 adjacent partition 24 define therewith a similar hollow triangular section. The frame 10 thus far described may be fabricated from a suitable molded plastic or the like.

Contained between partitions 18, 20, 22 and 24 are three transparent fluid containing chambers 34, 36 and 38. Each chamber has a rectangular open center section 40, 42, 44 to provide restricted passages 46, 48 and 50, respectively. The arrangement is such that each chamber has a pair of enlarged volume ends 52, 54; 56, 58; and 60, 62 which are in fluid communication via restricted passageways 46, 48 and 50, respectively.

Each chamber is partially filled with a liquid; however, solid particulate material may be employed. The material in any one chamber has a different viscosity than that within any other chamber. For example, chamber 34 may contain water, chamber 36 may contain oil and chamber 38 may contain honey.

The chambers may be prefabricated of a transparent plastic material and removably fitted and secured between their respective partitions in any well known manner.

In operation, a child can grip the device by any of the sides 26, 28, 30 or 32 which function as handles to orient the same in different positions. As this is done the fluid within each of the chambers 34, 36 and 38 will begin to flow from the uppermost enlarged volume end of each chamber to the lowermost enlarged volume end. However, since the material within each chamber has a different viscosity this flow will be at different rates which the child can observe. Thus, the child's interest will be maintained longer than would be the case with a conventional toy.

Inasmuch as the chambers 34, 36 and 38 may be removable, it is contemplated that additional chambers containing fluid of other viscosities may be inserted to keep the child's interest and to add to his observation of many different flow rates.

Although a preferred embodiment of the present invention has been described, changes will obviously occur to those skilled in the art. It is therefore intended that the present invention is to be limited only by the scope of the appended claims.

I claim:

1. An amusement device of the character described, comprising;
  (a) a housing comprising an open frame having a plurality of flat sides whereby said frame can be oriented on a surface in as many positions as there are sides,
  (b) a plurality of partitions between a pair of opposite flat sides defining a plurality of rectangular cross-sectioned openings,
  (c) a plurality of transparent chambers, having outer dimensions substantially corresponding to that of said openings, removably located in said openings,
  (d) each of said chambers having a central through-opening of generally rectangular cross-section to thereby define opposed restricted channels between said through-opening and the walls thereof which are in contact with said partitions,
  (e) said channels being in fluid communication with enlarged volume portions of said chambers at opposite ends thereof,
  (f) a flowing material of different viscosities located in each of said chambers, and
  (g) handle means formed by at least two of said flat sides to facilitate orientation of said housing in various positions on each of said flat sides such that the different flow rates of said material in each of said chambers can be controlled and observed as the same flows from one of said enlarged volume portions to the other through said opposed restricted channels.

2. The device according to claim 1, wherein;
  (h) said open frame comprises six flat sides with four spaced partitions extending between an opposite two of said sides, and
  (i) said handle means comprises two legs of the triangle formed by two adjacent flat sides and one partition at opposite ends of said frame.

* * * * *